Patented Feb. 26, 1935

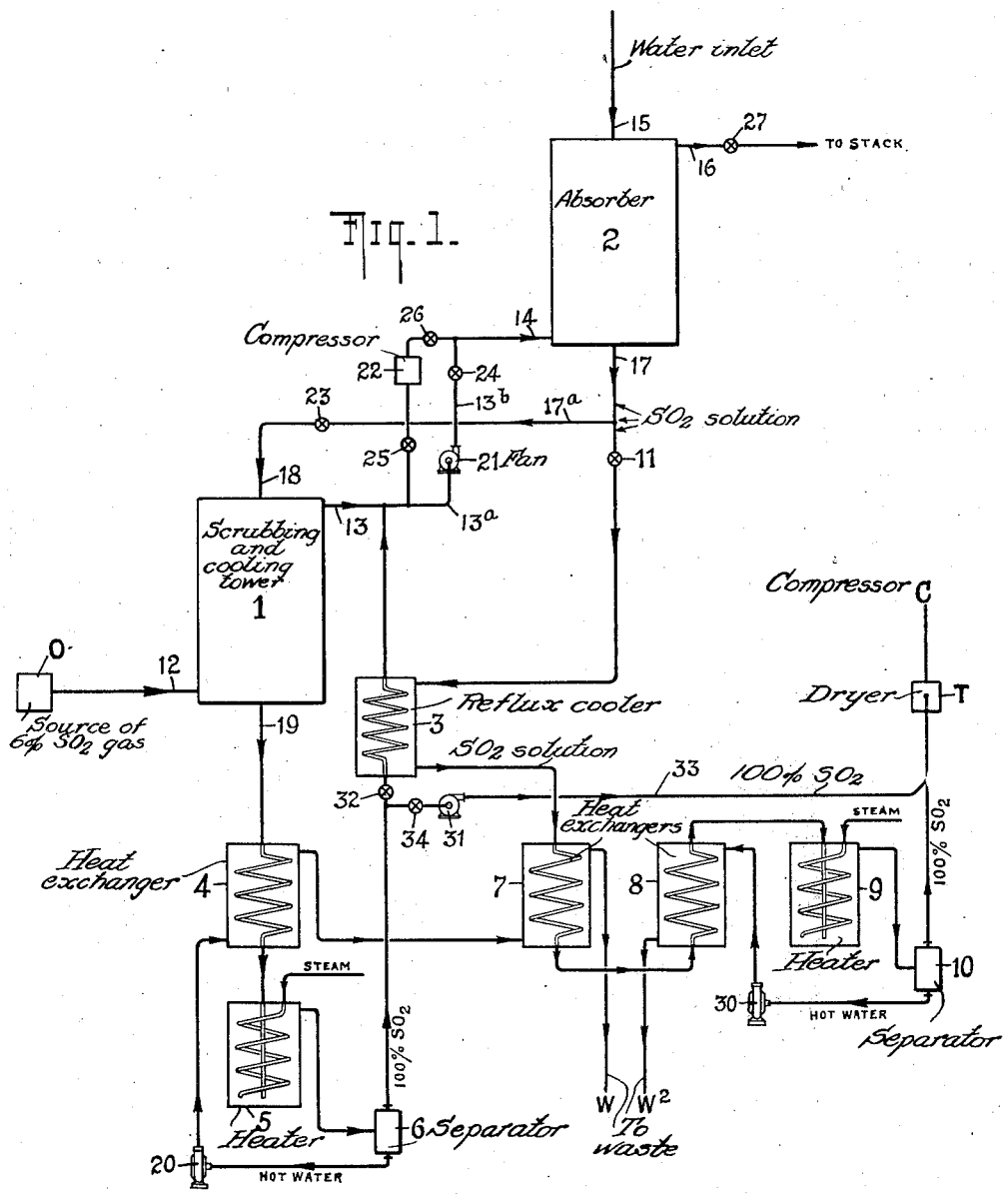

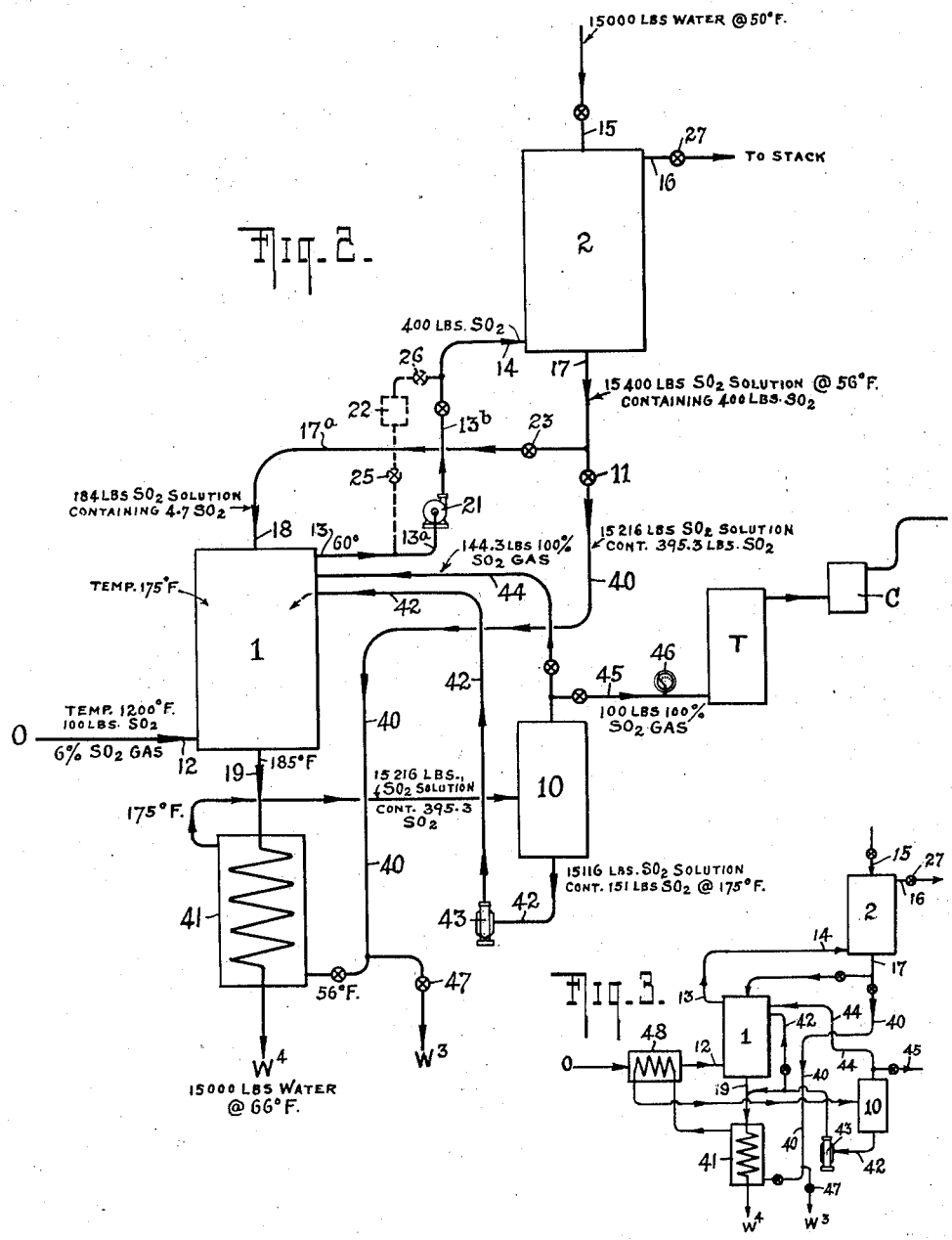

1,992,295

UNITED STATES PATENT OFFICE 1,992,295

METHOD OF PRODUCING $SO_2$

Fredik W. de Jahn and Jacob D. Jenssen, New York, N. Y.

Application September 16, 1931, Serial No. 563,025

12 Claims. (Cl. 23—180)

This invention relates to the production of $SO_2$ in such manner as to enable it to be recovered in the form of 100%, $SO_2$, and the object of the invention is to accomplish said end by appropriate economic and relatively inexpensive apparatus and procedure.

Gases containing $SO_2$ are ordinarily generated by burning sulphur or sulphur-bearing ores with air. When sulphur (brimstone) is burned, a gas containing 15% to 17% $SO_2$ is obtained, while when sulphur-bearing ores are burned, gases containing from 6% to 11% $SO_2$ are obtained. According to existing practice, 100% $SO_2$ can be obtained by cooling and scrubbing $SO_2$ containing gases with water which dissolves the $SO_2$, and the solution of $SO_2$ in water is then heated to drive out the $SO_2$ which is then liquefiable at atmospheric temperatures at a pressure of about 100 pounds per square inch. This process requires large quantities of water and fuel and is correspondingly costly. The reason why large quantities of water are necessary is that the solubility of $SO_2$ in water is not very high and depends on the percentage of $SO_2$ in the gases and the temperature of the water used for absorption. For example, a gas containing 15% $SO_2$ will produce a solution in water at a temperature of 68° F. which contains 1.7% $SO_2$ by weight. A gas containing 10% $SO_2$ will produce a 1.1% solution and a gas of 6% $SO_2$ will only produce a .67% solution. In other words even if the $SO_2$ is generated by burning sulphur yielding the maximum strength of $SO_2$ in the gas, large quantities of water are needed for absorption with consequent correspondingly large expenditure of heat and for equipment for the removal of the $SO_2$ from the large volume of solution, and in a case of gases containing from 6% to 8% $SO_2$ which are representative of most smelter gases, the solubility of the $SO_2$ is so small as to make the recovery of 100% $SO_2$ altogether too costly.

We have now devised a method of concentrating the $SO_2$ gas in a manner so simple, efficient, and inexpensive, that 100% $SO_2$ can be obtained at a cost of production which makes the use of $SO_2$ possible in industries where its cost up to the present has been prohibitive.

The invention is illustrated in the accompanying drawings which represent diagrammatically the method of procedure and the apparatus required, Fig. 1 showing one course of procedure and Fig. 2 a modified form, and Fig. 3 is a modified detail of Fig. 2.

The process and apparatus of Fig. 1

First describing Fig. 1, O represents the source of the $SO_2$-bearing gases. The source may be brimstone burners or pyrites burners, but preferably they are smelter gases which represent a waste product into which consequently no element of cost enters and where a saving even may result because of avoidance of any expense for eliminating nuisance due to escaping acid gases. The hot $SO_2$-bearing gases are introduced through the inlet 12 into the bottom of the scrubbing and cooling tower 1 at a temperature of between 1200° to 1800° F. The tower is fed through the inlet 18 with a water solution of $SO_2$ from the absorber 2. The gases leave the tower 1 through the outlet 13 and pass into the bottom of the absorber 2 through the line 13a, 13b, and 14. Sufficient water is introduced into the absorber 2 through its upper inlet 15 to absorb all of the $SO_2$ in the gases, said gases freed from $SO_2$ then leaving the absorber 2 through the outlet 16 past valve 27 to the stack. The amount of water depends on the temperature and percentage of $SO_2$ in the gas. The solution of $SO_2$ in water leaves the absorber 2 through the outlet 17 and passes through the line 17a into the tower 1 through the inlet 18. In the tower 1 the solution cools the hot gases entering at 12 and is itself heated up so as to give up the dissolved $SO_2$. Inasmuch, however, as the amount of water needed for absorbing the $SO_2$ in the absorber 2 exceeds the amount needed to cool the hot gases to water temperature, only a part of the dissolved $SO_2$ is driven out in tower 1. As it is an object of the invention to free the solution from $SO_2$ as completely as possible, the solution which leaves the tower 1 through the outlet 19 is passed through a heat-exchanger 4, then through the heater 5, where it is heated up to about 200° F., preferably by means of steam. The hot liquid next enters the separator 6 where the $SO_2$ gas is separated from the hot water. The $SO_2$ gas from the separator 6 is cooled in the reflux cooler 3 and enters the pipe 13a through which the gases from the tower 1 flow on their way to the absorber 2, thereby increasing the percentage of $SO_2$ in the gases entering the absorber 2. Inasmuch as the solubility of $SO_2$ in water is directly proportional to the percentage of $SO_2$ in the gases, the same amount of water constantly introduced into the absorber 2 will absorb just as completely 20 pounds of $SO_2$ with 20% $SO_2$ in the gas as 10 pounds of $SO_2$ with 10% $SO_2$ in the gas, the result being that the $SO_2$ solution, leaving the absorber 2, will gradually contain a higher percentage of dissolved $SO_2$, which, being introduced into the tower 1, will gradually increase the percentage of $SO_2$ in the gas leaving the tower 1 (with or without additional $SO_2$ from the separator 6) which in turn will increase the percentage of $SO_2$ in the solution from the absorber 2. For example, if 100 pounds $SO_2$ per hour in the form of hot 10% gas is introduced at point 12 into the tower 1, this will all be absorbed in the absorber 2 and returned to the tower 1. After an hour the gas leaving the tower will contain 20 volumes of $SO_2$ and 90 volumes inert gases or 18.18% $SO_2$ by volume. After two hours, the gas leaving tower 1 will contain 30 volumes of $SO_2$ and 90 volumes inert gases or 25% $SO_2$ by volume. After eight hours the gas leaving tower 1 will contain 90 volumes of $SO_2$ and 90 volumes of inert gases or 50% $SO_2$, and therefore, at the end of eight hours, the solution leaving the absorber 2 will contain 5.50% $SO_2$ by weight instead of 1.1% $SO_2$ by weight as at the beginning of the run with 10% $SO_2$ in the hot gases entering the tower 1. If, therefore, after eight hours (still continuing the example) one-fifth of the solution is constantly withdrawn through regulating valve 11 and heated up to 200° F. by passage through the reflux cooler 3, heat-exchangers 7 and 8 and heater 9, the total amount, 100 pounds $SO_2$ per hour (entering tower 1), is recovered as 100% $SO_2$ at a cost which represents but one-fifth of the expense which would be required to produce 100% $SO_2$ by previously known methods. The hot water which leaves the separator 6 is passed through the heat-exchanger 4 by means of the pump 20 and gives up approximately 77% of its heat to the $SO_2$ solution flowing through the heat-exchanger 4. The remaining heat of this water is utilized to preheat in the heat-exchanger 7 the $SO_2$ solution which flows from the reflux cooler 3 into the heat-exchanger 7. After passing through the heat-exchanger 7, this water is run to waste as indicated at W, or if shortage of water exists, then into a cooling tower from whence it may be pumped to the top of the absorber 2.

The preheated $SO_2$ solution from the heat-exchanger 7 is passed through the heat-exchanger 8 where it is preheated by hot water from the heater 9. From the heater 9 the hot $SO_2$ solution enters the separator 10, where the 100% $SO_2$ gas is separated from the hot water, the $SO_2$ gas having been freed from water vapor in drying tower T by scrubbing with strong sulphuric acid (preferably 91% to 93%). The dried $SO_2$ gas is then compressed at C to approximately 100 pounds pressure, cooled, liquefied, and stored or shipped.

The hot water from the separator 10 is pumped by the pump 30 through the heat-exchanger 8, counter-current with respect to the $SO_2$ solution passing through the heat-exchanger 8 and ultimately passes to waste at $W^2$ or is dealt with in the same manner as the water flowing out at W.

A fan or ventilator 21 draws the hot gases through the tower 1 and forces the cooled gases through the absorber 2.

In cases where there is a shortage of water or if strong solutions of $SO_2$ in water are desired, the ventilator 21 may discharge the gases into a compressor 22, in which case valve 24 is closed and valves 25 and 26 are opened. The compressor 22 compresses the gas to a minimum of 14.7 pounds above atmospheric and the $SO_2$ in the compressed gas is absorbed under this pressure in the absorber 2, valves 11, 23, and 27 being partly closed and thereby serving to maintain pressure in the absorber 2.

The solubility of $SO_2$ increases proportionately with the pressure and is therefore double at a pressure of 14.7 points above atmospheric. By this means with the gases containing 50% $SO_2$ at the inlet of the compressor, the compressed gas will be equal to 100% $SO_2$ in relation to the water, and the maximum strength of $SO_2$ solution is therefore obtained.

In cases where the water entering the absorber 2 is excessively cool (as in winter or for other reasons) and the hot gases entering the tower 1 are of medium temperature, say 1000°–1200° F., it is not necessary to return the $SO_2$ from the separator 6 through reflux cooler 3 and back into the line 13a. In such cases the valve 32 is closed, valve 34 opened, and a fan 31 in the connection 33 shown in dotted lines leads any $SO_2$ from the separator 6 directly into the 100% $SO_2$ line leading from the separator 10 to the drying tower T.

In a typical operation of the system as thus far described, the strength of the $SO_2$ solution in the absorber 2 is brought up to say 2% or 3% and this condition is thereafter maintained by regulating the rate of flow of the $SO_2$ solution to the heater 9, for example by manipulating the valve 11 until the amount of $SO_2$ recovered at the compressor C is equal to the amount of $SO_2$ entering the system at 12. So long as the $SO_2$ output at C is equal to the amount of $SO_2$ entering at 12, the system will maintain its balance at whatever point is selected for most advantageous operation. In some cases the $SO_2$ solution in the absorber 2 may be maintained at 6% or other percentages. Whatever the degree of solution to be maintained may be, however, it will be in excess of 1% for practical purposes.

*Process and apparatus of Fig. 2*

In Fig. 2 a modification of the invention is depicted which has considerable advantages over the layout shown in Fig. 1. The two figures have in common the source of $SO_2$-bearing gases O, the gas inlet 12, the scrubbing and cooling tower 1, the gas outlet 13, the fan 21, the gas inlet line 14, the absorber 2, the water inlet 15, the gas outlet to the stack 16, the solution outlet 17 from the absorber 2 and the branched connection 17a with its liquid inlet 18 into tower 1, the other branch being under the control of regulating valve 11. In Fig. 2, however, the solution which passes valve 11 takes a different course from that shown in Fig. 1. From 11 in Fig. 2 the solution passes through line 40 into the heat-exchanger 41, in which the temperature of the solution is raised to say 175° F. The solution thereupon at said temperature passes through the separator 10 and the liquid part is returned through line 42 and pump 43 into the tower 1 at a point sufficiently high to increase the temperature of the hot liquid flowing in through the line 42 plus the cold liquid flowing in at 18 to say 185°, while leaving sufficient room above to enable the inflowing cold solution at 18 to cool the gases of the tower 1 to approximately the temperature of the solution flowing in at 18. The amount of solution flowing in at 18 is regulated through valve 23 to accomplish the said purpose of obtaining approximately equal temperature of the inflowing solution and the outflowing gas.

The $SO_2$ gas which is separated from the hot water in the separator 10 is used in part for reintroduction into tower 1 through line 44, strengthening the $SO_2$ content of the gas leaving the tower 1. The balance of the gas is withdrawn through line 45, past the indicator 46 into the drier T and then to the compressor C. The indicator 46 enables the operator to apply such control to the system as will maintain the withdrawal of the final $SO_2$ product at C at the same rate as $SO_2$ enters the tower 1 through inlet 12.

In some cases it is advisable to maintain the final separator 10 under partial vacuum so as to facilitate the removal of the right amount of $SO_2$ from the solution without being obliged to heat the solution up too high before running it to the scrubbing and cooling tower 1. This would apply for example, in case the $SO_2$ in the gas entering the cooling tower at 12 is 6% or less and the cooling water entering the absorber 2 is 70% or higher.

In Fig. 2 legends have been applied to illustrate the temperature conditions and the quantities of water and $SO_2$ at different parts of the system. These legends are, of course, illustrative merely. They show, however, that the system, once it is in complete operation, is thermally self-sustaining, not requiring, as in the case of Fig. 1, the use of any steam or heat from outside sources. This, of course, is of great importance from an economical standpoint.

When the apparatus shown in Fig. 2 is started up, the whole of the solution passing through the line 40 is not introduced into the heat exchanger 41, but the major part of the solution is removed at $W^3$ and either flows to waste or is used as indicated in connection with the liquid outlets W, $W^2$ of Fig. 1. That part of the solution running through line 40 which enters the heat interchanger 41, is heated up by the hot liquid flowing through the line 19 and as the heat gradually builds up and is returned into the tower 1 through the line 42, more and more of the solution is allowed to pass from the line 40 into the heat exchanger 41 and finally when the apparatus is fully functioning, the valve 47 is closed and no water leaves the system at all except through the outlet $W^4$. In the meantime, as more of the solution passes through the heat interchanger 41, less of the solution passes through line 17a into the tower 1. The temperature in the lower part of the tower 1 is such that the liquid leaving at 19 is free from $SO_2$ so that there is no loss of $SO_2$ at the outlet $W^4$ and there is no requirement at this point, as in the case of Fig. 1, for using any heater such as 5, separator 6, pump 20, reflux cooler 3 or a subsequent heater 9.

It will be seen that the system illustrated in Fig. 1 supplies practically all but a very small part of the heat needed for the entire operation, only a relatively small amount of specially created heat being required for the heaters 5 and 9 and for the operation of the pumps, fans, and compressor. In the case of Fig. 1 the pumps, fans, and compressors are preferably steam-driven, and the exhaust steam which is still sufficiently hot for the work required in the heaters 5 and 9 (in view of the heat economy of the system as a whole) are used for the said heaters. In Fig. 2, the system itself supplies all the heat which is needed for the entire operation of the system as such, so that the pumps, fans, and compressors can all be driven by electric, hydraulic, or other forces, including, of course, steam, if economically available.

It is to be understood that all figures heretofore given in this specification and in the drawings are illustrative merely.

In the case of the present invention it will be seen that the apparatus is relatively simple, so that the cost of installation and maintenance is small, while performance is continuous, requiring very little supervision. The hot $SO_2$ gases from the smelters, being waste gases, are cost-free, and the only element of cost involved in the entire process lies in obtaining an adequate water supply and the cost of the small amount of power which is necessary to drive the pumps, the compressors, and the fans, and (in the case of Fig. 1) to supplement the heat which accumulates in the apparatus and is required for the final extraction of $SO_2$ from the water solution.

The foregoing invention is of particular value as a means for utilizing the waste and troublesome $SO_2$ gases from smelters and for rendering available the $SO_2$ recovered by the use of the process for industries such as the sulphite pulp industry which desire a source of supply of 100% $SO_2$ but have no source for this material except at costs which are prohibitive for their particular situation.

Inasmuch as the product of the process is 100% $SO_2$, it can be used effectively and conveniently in the manufacture of sulphuric acid in localities where local manufacture of $SO_3$ by the contact method or the like would be profitable, but where it is desirable to avoid the capital outlay for erecting and operating sulphur burners and purification stages and the shipment and handling of sulphur or impurities. As a matter of fact, the cost of treating hot $SO_2$ gases according to the present process to obtain pure $SO_2$ is so much less than the cost of the present practice of purifying the gases now utilized in all existing contact sulphuric acid plants that it would be profitable to reform the conduct of the contact sulphuric acid process so as to have it begin with the preparation of 100% $SO_2$ in accordance with the methods described in this application, then mixing the 100% $SO_2$ thus obtained with air in the proper proportions for conversion into sulphuric anhydride and then passing the mixture thus obtained over a catalyst capable of supporting the reaction by which $SO_2$ plus oxygen are converted into $SO_3$. Both as to cost of plant as well as cost of operation the new method of making sulphuric acid represents a distinct and important advance over any known methods. The process can also be usefully employed where $SO_2$ is desired for metallurgical operations in a locality near which there is an available supply of sulphur pyrites or sulphur-bearing material.

In Fig. 3 of the drawings the hot solution in the heater 41 of Fig. 2 is shown as being led through a heater 48 in the hot gas line extending from 0 to 12, where it receives indirect heat and then discharges at a temperature sufficiently high to assure the liberation of all absorbed $SO_2$ into the separator 10. The hot water from separator 10 is now not only free from absorbed $SO_2$, but sufficiently hot to be available as a part of the the heating medium flowing through 41 and is consequently discharged into the hot water line 19, while only such part of this hot water as may be necessary for washing the gases in the tower 1 is returned directly to the tower 1.

We claim:

1. The process which comprises establishing a supply of hot $SO_2$-bearing gas, the $SO_2$ content of which is less than 50%, leading such hot gas into direct contact with a cool aqueous medium containing $SO_2$ in solution and thereby releasing $SO_2$ from the solution, absorbing the gaseous $SO_2$ in said step in water and introducing the whole of the solution thus formed into the hot $SO_2$-bearing gas until equilibrium is established in the solution and the $SO_2$ liberated from the solution plus the $SO_2$ of the hot gases reach a percentage which approximates the capacity of $SO_2$ absorption of cool water at the prevailing temperature and pressure, then bringing the gases resulting from the contact of the hot $SO_2$ bearing gases and the $SO_2$ solution first mentioned into absorbing contact with cool water and using thereafter such part only of the solution thus obtained as the aqueous medium to be brought into direct contact with further incoming hot $SO_2$ gases as will continuously maintain the established equilibrium in the absorption stage, and leading the balance of said solution to a region of temperature sufficiently elevated to drive $SO_2$ out of the solution, separating the $SO_2$ thus obtained from the hot water and confining said gas for use as 100% $SO_2$.

2. A process such as set forth in claim 1 in which the aqueous medium, after contact with the hot $SO_2$ gas, is separated from any $SO_2$ still contained therein and such $SO_2$ is recovered as a part of the ultimate $SO_2$ product of the entire process.

3. A process such as set forth in claim 1 in which the aqueous medium, after contact with the hot $SO_2$ gas, is separated from any $SO_2$ still contained therein and such $SO_2$ is recovered as a part of the ultimate $SO_2$ product of the entire process, the heat contained in the aqueous medium after such separation being employed as a means for elevating the temperature of the $SO_2$ solution in the final step wherein the ultimate $SO_2$ product is separated from that part of the strong $SO_2$ solution which is not used as the aqueous medium to cool and enrich the hot gases with $SO_2$.

4. A process such as set forth in claim 1 in which the heat contained in the aqueous medium after contact with the hot gases plus heat imparted to effect separation of $SO_2$ in any stage of the procedure is conserved and utilized to elevate the temperature of the rich, cool $SO_2$ solution to bring the temperature as close as possible to that where $SO_2$ is liberated from the solution in the final stage of the process where the ultimate $SO_2$ product of the process is collected as product.

5. A process such as described in claim 1 in which the gases resulting from contact between the hot $SO_2$ gases and the aqueous medium are compressed prior to being brought into absorbing contact with the cool water.

6. A process such as set forth in claim 1 in which water separated from $SO_2$ in the ultimate stage of the process where $SO_2$ is recovered as product, is returned as cool water to the cool water supply used to absorb $SO_2$ from the gas mixture which results from contact between the hot $SO_2$-bearing gases and the aqueous medium.

7. A process as set forth in claim 1 in which temperature conditions are maintained at that stage of the process where the hot $SO_2$-bearing gas comes into contact with the aqueous medium that said aqueous medium, upon discharge from said stage, shall be substantially free from $SO_2$.

8. A process as set forth in claim 1 in which temperature conditions are maintained at that stage of the process where the hot $SO_2$-bearing gas comes into contact with the aqueous medium that said aqueous medium, upon discharge from said stage, will contain sufficient heat to effect, under heat-exchange conditions, effective separation of $SO_2$ from that part of the rich $SO_2$ solution which is employed for the recovery of the ultimate $SO_2$ product of the process as a whole.

9. A process such as set forth in claim 1 in which the hot aqueous residue from the final separation of $SO_2$ from the solution is returned under retention of its heat to the initial stage of the process for contact with a fresh supply of hot $SO_2$ gases.

10. A process such as set forth in claim 1, in which the $SO_2$ separated from the solution at the end of the process is divided, one portion being withdrawn, dried, and compressed as final product while the other portion is introduced into the gas stream in the region where it comes into direct contact with the cool aqueous solution rich in $SO_2$.

11. The process as set forth in claim 1 in which such a relation of temperatures in the several parts of the system is maintained that the entire process is thermally independent of exterior sources of heat other than those involved in establishing the supply of the hot $SO_2$-bearing gas, said maintenance including, after the establishment of the equilibrium set forth, a constant inflow at relatively constant high temperature $SO_2$-bearing gas to the stage where it meets the cool aqueous medium containing $SO_2$ in solution, a constant inflow, at relatively constant cool temperature, of water to the stage where $SO_2$ is absorbed, a relatively constant flow of a part of the $SO_2$ solution from the absorbing stage into the hot $SO_2$-bearing gases, temperature regulation as between said cool solution and said hot gases, such that the cool solution and the hot gases are maintained in contact for a sufficient period of time not only to release substantially the whole of the $SO_2$ content of the solution but to impart to the residual water a temperature sufficient to enable the whole of the $SO_2$ solution withdrawn for recovery of $SO_2$ to be so elevated in temperature as to effect release of substantially the whole of the $SO_2$ of said solution.

12. A process such as set forth in claim 1 in which, after separation of the ultimate $SO_2$ product of the process, said $SO_2$ is subjected to drying and liquefaction by cooling and compression with subsequent cooling.

FREDRIK W. de JAHN.
JACOB D. JENSSEN.